United States Patent [19]

Geiger et al.

[11] Patent Number: 5,402,946

[45] Date of Patent: Apr. 4, 1995

[54] EXPLOITATION OF PLASTIC WASTES

[75] Inventors: Thomas Geiger, Ludwigshafen; Rainer Roemer, Laudenbach; Helmut Seifert, Ludwigshafen; Ulrich Traegner-Duehr, Trier; Ulrich Broeckel, Limburgerhof; Joachim Meyer, Maxdorf; Axel Griebel, Heidelberg, all of Germany

[73] Assignee: BASF Aktiengesellschaft, Ludwigshafen, Germany

[21] Appl. No.: 116,954

[22] Filed: Sep. 7, 1993

[30] Foreign Application Priority Data

Sep. 11, 1992 [DE] Germany .................. 42 30 400.8

[51] Int. Cl.$^6$ ............................................. B02C 23/18
[52] U.S. Cl. ......................................... 241/17; 241/21; 241/DIG. 38
[58] Field of Search ................ 241/16, 20, 22, 24, 241/DIG. 38, 23, 17, 21

[56] References Cited

U.S. PATENT DOCUMENTS

| | | | |
|---|---|---|---|
| 3,579,320 | 5/1971 | Pesses | 241/DIG. 38 X |
| 3,736,223 | 5/1973 | Marsh | 241/DIG. 38 X |
| 3,910,775 | 10/1975 | Jackman | 241/DIG. 38 X |
| 4,586,659 | 5/1986 | Easter, II | 241/DIG. 38 X |

Primary Examiner—Timothy V. Eley
Attorney, Agent, or Firm—Keil & Weinkauf

[57] ABSTRACT

A process for exploiting plastic wastes arising in the production or further processing or after use of the plastic, by, in a sewage treatment plant, comminuting the plastic wastes then mixing them with a sewage sludge to which organic flocculants are added with or without the addition of further amounts of finely divided coal and/or ash, if appropriate, modifying the surface properties of the plastic with binders in such a way that it binds better into the sludge, filtering the pretreated sludge mixture, where the plastic can assume the properties of a filtration aid, i.e. the filtering residue is reduced, incinerating the resulting filter cake, where the plastic assumes the function of an additional energy source and depositing the ash for example in a sanitary landfill or exploiting it.

7 Claims, 1 Drawing Sheet

EXPLOITATION OF PLASTIC WASTES

The present invention relates to a process for exploiting plastic wastes arising in the production or further processing or after use of plastic.

The plastic is in the form of granules if it originates from production waste, or in any form, e.g. as films or bottles, if it originates from general waste.

Plastics are generally characterized by macromolecules built up for example from carbon, hydrogen, oxygen, nitrogen, chlorine, fluorine, sulfur or silicon. In general, they are distinguished by high calorific values.

Disposal of plastics by landfilling is possible in principle, but a disadvantage is that the calorific value of the plastics is then lost.

It is an object of the present invention to develop a process in which the residual amount for landfilling is greatly reduced, the plastic materials are recycled, the calorific value of the plastic wastes is utilized and the total disposal costs are reduced.

We have found that this object is achieved by
a) comminuting the plastic wastes, then mixing them with a sewage sludge to which organic flocculants are added with or without the addition of further amounts of finely divided coal and/or ash,
b) if appropriate, modifying the surface properties of the plastic with binders in such a way that it binds better into the sludge,
c) filtering the pretreated sludge mixture, where the plastic can assume the properties of a filtration aid, i.e. the filtering resistance is reduced,
d) incinerating the resulting filter cake, where the plastic assumes the function of an additional energy source and
e) depositing the ash for example in a sanitary landfill or exploiting it, or
a) if appropriate, comminuting the plastic wastes
b) and then mixing them with a previously filtered mixture of sewage sludge, organic flocculants with or without further amounts of finely divided coal and/or ash inside or outside an incinerator,
c) filtering it again if appropriate,
d) incinerating the resulting mixture and
e) depositing the ash for example in a sanitary landfill or exploiting it.

Process steps 1 and 2 can be carried out in principle by the processes described in European Patents 53 250 and 53 251 for dewatering sewage sludges on filter presses. In these processes, sewage sludges are mixed with additives, such as finely divided coal or ash or mixtures thereof, in an amount of from 0.5 to 1.5 parts by weight per part by weight of sludge solids, treated with organic flocculants in an amount of from 1 to 7 or from 2 to 8 kg per t of sludge solids and then substantially dewatered by pressure filtration on filter presses.

The addition of finely divided coal, or the particular type of sludge conditioning (process step 1) and sludge dewatering (process step 2), produces filter cakes which can be independently incinerated in fluidized-bed furnaces or multiple-hearth furnaces. Energy-consuming drying of the sewage sludge filter cakes or addition of further amounts of finely divided coal and/or heating oil in order to be able to incinerate the filter cakes is not required. The processes thus operate with the minimum amount of coal required to achieve independent incineration of the sewage sludge filter cakes.

It is an object of the present invention to utilize the calorific value of the plastic wastes. This is achieved by adding the plastic wastes, before or after the filtration, to sewage sludges, which are to be dewatered and then incinerated for example by the processes of European Patents 53 250 or 53 251.

This permits the amounts of finely divided coal required for the independent incineration of the sewage sludge filter cakes to be wholly or partially replaced by plastic wastes, utilizing their calorific value and reducing the use of primary energy sources.

In addition, filtration according to the invention allows the plastic component to be used for improving the filtration properties by reducing the filtering resistance, since the sludge to be filtered with added plastic exhibits better dewatering in filtration units than in the case of dewatering without added plastic. Furthermore, this procedure means that it may be possible to do without other filtration aids, for example ash; this means that the amounts of filter cake are in some cases reduced, but in particular the content in the filter cake of sludge dry matter removed is increased.

For the purposes of the present invention sewage sludges are primary sludges obtained in the preliminary clarification stage of a treatment plant by sedimentation of the sludge solids, activated sludges continuously discharged as excess sludges from biological treatment plants, mixed sludges produced by mixing activated sludge and primary sludge, and septic sludges. These sludges can be of municipal, industrial or mixed origin.

The solids content of such sludges is generally from 0.5 to 5.0% by weight, higher when organic flocculants were used as early as at the sludge thickening stage.

Organic flocculants are used to improve the dewaterability of the sewage sludge to which plastic wastes have been added. Commercial flocculant brands can be used; these are water-soluble, macromolecular compounds obtained by polymerization or copolymerization of acrylamide, acrylic acid and/or salts thereof, or of esters of acrylic acid or methacrylic acid specifically modified via their alcohol component. The flocculants are further differentiated by their differing electrical charge (cationic, anionic or electrically neutral) and by their degree of polymerization.

The flocculants are used in the form of from 0.05 to 0.2% strength aqueous solutions; their preparation from the solid and liquid commercial products is carried out by known methods in commercial apparatuses.

The required amounts of flocculants are from 1 to 8 kg of flocculant/t of sludge solids, depending on the type of sludge and the solids concentration.

The preselection of the organic flocculants to be used can be carried out on a laboratory scale, e.g. by the methods which have been described in European Patent 8425; the same applies to the determination of the amount of coal required to be added for independent incineration of sewage sludge filter cakes.

When finely divided coal is used alone, the weight ratios of coal dry matter (CDM):sludge dry matter (SDM) are from 0.1:1 to 2.0:1. The amount of coal required is highly dependent on the dewatering behavior of the particular sewage sludges.

Sewage sludge incineration has hitherto been predominantly carried out in large treatment plants producing relatively large quantities of sludge. If the amounts of plastic wastes arising are not sufficient to cover the amount of coal required for independent incineration of sewage sludge filter cakes, either finely divided coal or finely divided coal and ash are additionally added.

The following types of finely divided coal are used: fine coals obtained in the separation of fine coal and gangue (matrix) by flotation and subsequent dewatering; coal slurries produced in the wet treatment process; and sieving fractions of power station coal or of green coke from refineries up to a grain size of 1 mm. In addition, carbon black, for example from the production of synthesis gas, as described in European Patent 441 209, can also be used.

If suitable filtration units are used to remove the solids, for example membrane filter presses, ash and possibly also the addition of coal is unnecessary. The function of these two materials can be replaced by ground plastic material having a corresponding calorific value.

If the use of ash is expedient as a further additive, ashes produced on site in the incineration of the sewage sludges are used; ashes produced from the combustion of coal in power stations can also be used.

If it is desired to use ash as an additional additive, the weight ratio can be, for example, from CDM:ADM (ash dry matter):SDM=0.2:0.3:1 to 0.6:1:1. The coal dry matter requirement can be wholly or partially replaced by plastic wastes.

The plastic wastes comminuted to from 0.3 to 2 mm and the additives which may be required are homogeneously distributed in the sewage sludges with the aid of batchwise or continuous mixers. Double-shaft mixers, stirred vessels and cylinder stirrers have proved to be particularly suitable.

Rotary cutters or hammer mills have proved to be particularly suitable for comminuting the plastic wastes, possibly with precomminution by cutter breakers or cutter comminutors. It is possible to carry out the comminution in the presence of coolants such as liquid nitrogen.

The addition of flocculants is carried out either in these mixers or upstream or downstream of the feed pump for the downstream filter presses.

For better binding of ground plastic material into sewage sludge, the filtration can be preceded by surface modification of the plastic particles. This surface modification causes the plastic particles, which are generally hydrophobic, to be re-wetted. If polymer dispersions are used, the specific surface area, even of plastic particles which are already hydrophilic, is increased and the bonding to the sewage sludge is additionally improved. Suitable wetting agents are polymer dispersions, e.g. styrene-butadiene dispersions, or alternatively surfactants, defoamers or similar surface-active substances, e.g. polyethylene glycols or polypropylene glycols.

These can be added to the sewage sludge, but preferably to the ground plastic material due to the amounts used, and, if desired, employed for direct modification of the plastic surface by addition of further chemicals, preferably the later flocculant.

The filter presses used can be chamber filter presses, frame filter presses or membrane filter presses. These are employed batchwise with relatively large layer thicknesses of from 20 to 40 mm.

The filtration times are from 90 to 180 minutes, and pressures of up to 15 bar are employed. If the measures according to the invention are complied with, the filter cakes detach without problems from the filter cloths and can thus be discharged under their own weight.

The solids contents achieved in the filter cakes can be from 35 to 55%, depending on the dewaterability of the sewage sludges and the plastic content. The calorific values of the filter cakes can be from 4,600 to 6,300 kJ/kg (1,100 to 1,500 kcal/kg). Incineration of the filter cakes can be independent.

The process according to the invention can also be carried out on continuous dewatering machines, such as e.g. belt filter presses or vacuum belt filters, where pure coal conditioning gives good results. The layer thicknesses of the filter cakes are generally from 3 to 15 mm. Additional use of ash is thus unnecessary. The solids contents and the calorific values of the filter cakes dewatered in particular on belt filter presses are at the same level as those from the abovementioned filter presses.

When the comminuted plastic wastes are used instead of commercial finely divided coals for conditioning and dewatering, no disadvantages are observed in the filtration times and the detachment behavior of the filter cakes from the filter cloths.

A further method of incinerating plastic wastes with sewage sludges is admixing the plastic wastes with the previously prepared filter cakes, either in an external mixer prior to delivery into the furnace or by separate delivery of the plastic wastes into the furnace.

In addition, the addition of plastic to filter cakes which have already been dewatered once can be followed by an additional dewatering step of the dry matter to achieve a significant increase in the calorific value of the filter cake.

Rigid arm elevators, twin-paddle screw conveyors and twin-screw conveyors have proved to be particularly suitable for mixing the plastic wastes with the previously dewatered sewage sludge filter cake prior to delivery into the furnace.

The filter cake for this is prepared as described above. When finely divided coal is used alone, the weight ratio of coal dry matter (CDM):sludge dry matter (SDM) is from 0.1:1 to 2.0:1. The amount of coal required is highly dependent on the dewatering behavior of the particular sewage sludges.

The same types of finely divided coal are used as described above.

When ash is used as an additional additive, the weight ratio is from CDM:ADM:SDM=0:0.5:1 to 0.6:1:1. The coal dry matter requirement can be wholly or partially replaced by the later addition of plastic wastes. Dewatering of the sewage sludge can then take place with the aid of the ash types defined in more detail above or is carried out with the use, according to the invention, of suitable plastic additives without ash.

The same presses are used for the dewatering as described above.

If the plastic wastes are added to the previously dewatered sewage sludge filter cake in a mixer prior to delivery into the furnace or are added in the furnace by a separate delivery point, it is not absolutely necessary to comminute the plastics to a grain size of from 0.3 to 2 mm. The size of the plastic wastes used can be from 0.3 mm to 30 cm.

A particular advantage of the process according to the invention is that the calorific value of the plastic wastes is utilized and that the ground plastic material considerably improves the filtration properties of sewage sludge without further additives.

The examples below illustrate the invention in greater detail. Parts and percentages are by weight.

In the examples, a mixed sludge from a mechanical/biological treatment plant was used which is composed of up to approximately 90% of excess sludge and up to approximately 10% of primary sludge and whose organic fraction in the sludge dry matter (SDM) is from 55 to 65%. The lower calorific value of the sludge dry matter is on average 14,600 kJ/kg (3,500 kcal/kg).

The finely divided coal used was flotation coal concentrates having a low calorific value of 29,300 kJ/kg (7,000 kcal/kg).

The ash used was the fly ash from the incineration of the mixed sludge conditioned and dewatered using flotation coal.

The plastic wastes used were films previously used in agriculture and also bottles or containers, all composed of polyethylene, polypropylene, polystyrene and PVC and of ground material from the production of automotive components. These were used separately or mixed. The lower calorific value of the polypropylene/polyethylene plastic wastes is on average 45,000 kJ/kg, for polystyrene 40,000 kJ/kg and for PVC 18,500 kJ/kg.

EXAMPLE 1

1,000 g of mixed sludge having an SDM content of 4.8% were first mixed with 4.8 g of polyethylene granules having a mean grain size below 1 mm.

24.6 g of water-moist flotation coal having a coal content of 78% and 38.4 g of dry ash were then added and mixed.

The stirrer used was a blade stirrer, edge length 70 70 mm, having 4 rectangular recesses each of 1 cm$^2$. The stirring frequency was 300 min$^{-1}$; the total stirring time was 15 min.

The mixing ratio of the components PGDM (plastic granules dry matter):CDM (coal dry matter):ADM (ash dry matter):SDM (sludge dry matter) was 0.1:0.4:0.8:1. The amount of supplementary fuel was composed of 20% of plastic granules.

168 ml of a 0.2% strength aqueous solution of an organic flocculant having 60% cationic modification was added to the mixture and stirred for 30 seconds at 200 min$^{-1}$.

1,000 g of the flocculated mixture were then applied to a Büchner filter of 120 mm diameter fitted with a polypropylene cloth and filtered by gravity. The filtrate was virtually free from solids.

After 30 minutes of gravity filtration, the filter residue was pressed in a laboratory hand press, filter surface 145 @ 145 mm between two polypropylene filter cloths for 2 minutes at 10 bar. A solid, dimensionally-stable filter cake resulted having the following characteristics:
  Total solids content: 52.7%
  SDM content: 22.5%
  Calorific value Hu: 5,717 kJ/kg (1,366 kcal/kg)
The filter cake was capable of independent combustion.

COMPARATIVE EXAMPLE

A mixture was prepared as described in Example 1 but without the addition of plastic granules; the amount of water-moist coal added was increased to 30.7 g. The dry matter mixing ratio CDM:ADM:SDM was 0.5:0.8:1.

The mixture was further treated as described in Example 1.

The data below were determined for the filter cake produced in the laboratory hand press:
  Total solids content: 52.3%
  SDM content: 22.7%
  Calorific value Hu: 5,427 kJ/kg (1,297 kcal/kg)
The filter cake was capable of independent combustion.

EXAMPLE 2

A mixture of mixed sludge, polyethylene granules, coal and ash was prepared and further processed as described in Example 1, but the mixing ratio PGDM:CDM:ADM:SDM was composed of 0.25:0.25:0.8:1. Half of the supplementary fuel was plastic granules.

The filter cake from the hand press had the following characteristics:
  Total solids content: 52.1%
  SDM content: 22.7%
  Calorific value Hu: 5,963 kJ/kg (1,425 kcal/kg)
The filter cake was capable of independent combustion.

EXAMPLE 3

A mixture of mixed sludge, polyethylene granules and ash (without coal addition) was prepared and processed as described in Example 1.

The mixing ratio PGDM:ADM:SDM was 0.5:0.8:1. The supplementary fuel was composed of 100% plastic granules.

The filter cake from the hand press had the following characteristics:
  Total solids content: 53.7%
  SDM content: 23.3%
  Calorific value Hu: 6,339 kJ/kg (1,515 kcal/kg)
The filter cake was capable of independent combustion.

EXAMPLE 4

A mixture of mixed sludge, polyethylene granules and coal (without addition of ash) was prepared and treated as described in Example 1.

The mixing ratio PGDM:CDM:SDM was established at 0.65:0.65:1. 50% by weight of the supplementary fuel was composed of plastic granules.

Pressing the filter residue in the hand press produced a filter cake having the following characteristics:
  Total solids content: 51.6%
  SDM content: 22.4%
  Calorific value Hu: 12,136 kJ/kg (2,881 kcal/kg)
The filter cake burnt independently.

EXAMPLE 5

154 kg of mixed sludge having an SDM content of 5.2% were first mixed with 4 kg of polyethylene granules. 4 kg of dry ash were also added and mixed in homogeneously.

The mixing ratio PGDM:ADM:SDM was 0.5:0.5:1.

The mixture was pumped for dewatering to a pilot chamber filter press, 450 450 mm, having 4 chambers, chamber depth 30 mm. 0.18 l of a 0.2% strength solution of an organic flocculant having 60% cationic modification was continuously added on the suction side of the pump per kg of mixture.

The filtration was terminated after 140 minutes at a final pressure of 15 bar.

After the filter press was opened, the filter cakes detached from the filter cloth under their own weight.

Characteristics of the filter cake (mean values):
Total solids content: 48.8%
SDM content: 24.4%
Calorific value Hu: 5,939 kJ/kg (1,419 kcal/kg)

The filter cake could be incinerated in a fluidized-bed furnace without supplementary fuels.

EXAMPLE 6

A mixture of mixed sludge and ash (without addition of plastic) was prepared and treated as described in Example 5. The mixing ratio ADM:SDM was established at 1:1.

As described in Example 5, the mixture was flocculated and dewatered on a pilot chamber filter press.

The filter cakes detached from the filter cloth under their own weight.

Characteristics of the filter cake (mean value):
Total solids content: 47.8%
SDM content: 23.9%
Calorific value Hu: 2,070 kJ/kg (495 kcal/kg)

The filter cake could be incinerated by separately feeding 86 g of polyethylene waste per kg of filter cake into a fluidized-bed furnace.

EXAMPLE 7a 12 kg of mixed sludge were mixed with 120 g of ground polystyrene (particle size <2 mm) without added ash and with 2.1 l of Sedipur CF 604 flocculant (0.1% w/v) in a stirred reactor.

7 l of this mixture were subsequently pumped by means of a Mohno pump into a membrane filter press (frame size 20 20 cm, chamber depth 20 mm, membrane material polypropylene). After a filling time of 15 minutes, the filter cake was dewatered for 140 minutes under increasing pressure (up to 4.5 bar). 775 g of filter cake containing 340 g of dry matter were obtained. The sludge dry matter made up 280 g thereof.
Total solids content: 43.9%
SDM content: 36.5%
Calorific value Hu: 6420 kJ/kg (1536 kcal/kg)

COMPARATIVE EXAMPLE 7b 6 kg of mixed sludge were mixed analogously to Example 7 with 30 g of ash and 33 g of sludge coal (82.4% w/v) per kg of mixed sludge with addition of 2.1 l of Sedipur CF 604 flocculant (0.1% w/v) in a stirred reactor. 6.5 l of this mixture were subsequently filtered in a membrane filter press as in Example 7. 888 g of filter cake containing 488 g of dry matter were obtained. The filter cake contained 213 g of sludge dry matter.
Total solids content: 54.9%
SDM content: 23.9%
Calorific value Hu: 6655 kJ/kg (1589 kcal/kg)

|  | Example 7b | Example 7a | Difference between a and b |
|---|---|---|---|
| Total amount filtered*1) | 6.5 l | 7.0 l | +8.0% |
| Total amount of filtrate | 5615.0 ml | 6625.0 ml | +11.0% |
| Total amount of filter cake | 885.0 ml | 775.0 ml | −13.0% |
| Filter cake dry matter | 488.0 g | 340.0 g | −31.0% |
| Sludge dry matter | 213.0 kg | 280.0 g | +31.0% |
| Proportion of | 43.0% | 82.0% | +39.0% |
| sludge dry matter in total dry matter | | | |
| Water loading index*2) | 1.79 | 1.55 | −11.0% |

*1)for the same filtration duration
*2)g of water/g of SDM

EXAMPLE 8

2 kg of ground polystyrene/polyvinyl chloride (50% each) were mixed with 118 kg of mixed sludge having an SDM content of 5.7%, and the mixture was flocculated with addition of 34 l of Sedipur solution (0.1% w/v). The mixture was filtered in a membrane filter press (chamber depth 25 mm, filter area 40 cm 40 cm, polypropylene filter cloth) over the course of 150 minutes under increasing pressure from 0–15 bar. Over all the filter plates, an average dry weight of 52.7% and an SDM of 40.5% ($\hat{=}$1.16 g of $H_2O$/g of SDM) were achieved. The calorific value was 7670 kJ/kg (=1835 kcal/kg).

EXAMPLE 9

1 kg of filter cake from sewage sludge filtration carried out with addition of coal and ash and containing 40.3% of total dry matter (53.4% thereof SDM) was additionally mixed with 57 g of ground polystyrene (<2 mm) and re-filtered in a laboratory belt filter press (polypropylene filter cloth). During this filtration, the filter cake employed was pressed at a pressure of 0.5–2 bar and a surface pressure line of 1.5–2.5 bar. The filter cake post-treated in this way had a total dry content of 66.5% and a calorific value of 10,588 kJ/kg (=2533 kcal/kg). The amount of filter cake was reduced from 1 kg to 662 g.

EXAMPLE 10a

Various types of plastic (amounts and types see table) were mixed as ground material (<2 mm) into 100 ml of Butonal solution (3.7% w/v) as stabilizing polymer dispersion.

This mixture is destabilized with stirring by addition of 100 ml of a solution of Sedipur flocculant (0.1% w/v). The polymer dispersion is distributed over the surface of the plastic particles with simultaneous hydrophilization.

This mixture is then stirred into a further 1.7 l of Sedipur solution and subsequently employed for flocculation of 6 kg of mixed sludge. 150 ml of the sludge flocculated in this way are filtered in a bench pressure filter unit (filter area 20 cm²) at 1.5 bar, and the filtering resistance is determined from the following formula:

$$+ = \frac{2 \text{ filter area pressure filtration time}}{\text{filtrate volume cake thickness}}$$

The following plastic types and amounts gave the corresponding filtering resistances:

| a) | 36 g of polypropylene | filtering resistance 31  $10^{12}$ mPas/m² |
|---|---|---|
| b) | 108 g of polypropylene | filtering resistance 9.7  $10^{12}$ mPas/m² |
| c) | 36 g of polypropylene | |

|   | 36 g of polyvinyl chloride |   |
|---|---|---|
|   | 36 g of polystyrene |   |
|   | 36 g of polyethylene | filtering resistance |
|   |   | 32  $10^{12}$ mPas/m² |
| d) | 27 g of polypropylene |   |
|   | 27 g of polyvinyl chloride |   |
|   | 27 g of polystyrene |   |
|   | 27 g of polyethylene | filtering resistance |
|   |   | 28  $10^{12}$ mPas/m² |

The added plastic particles are in all cases bound into the sewage sludge flocks, as shown in FIGS. 1 and 2.

Figure 1:
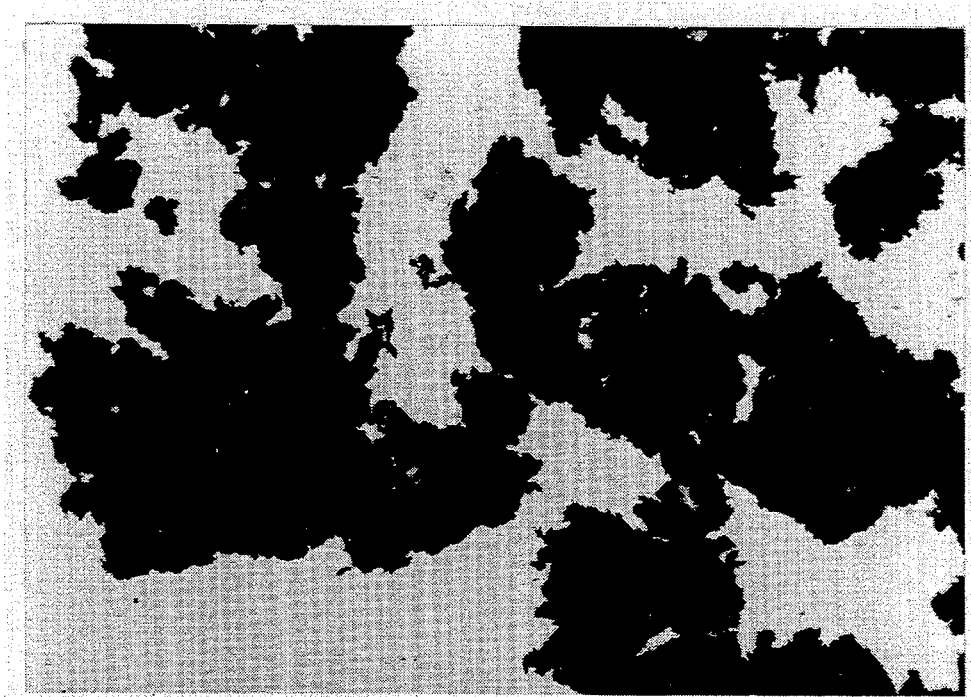
FIG. 1 shows surface-modified plastic particles. It can be seen here that the surface modification allows sewage sludge particles to accumulate at the plastic surface and enables binding of the ground plastic into the filter cake.
Figure 2:
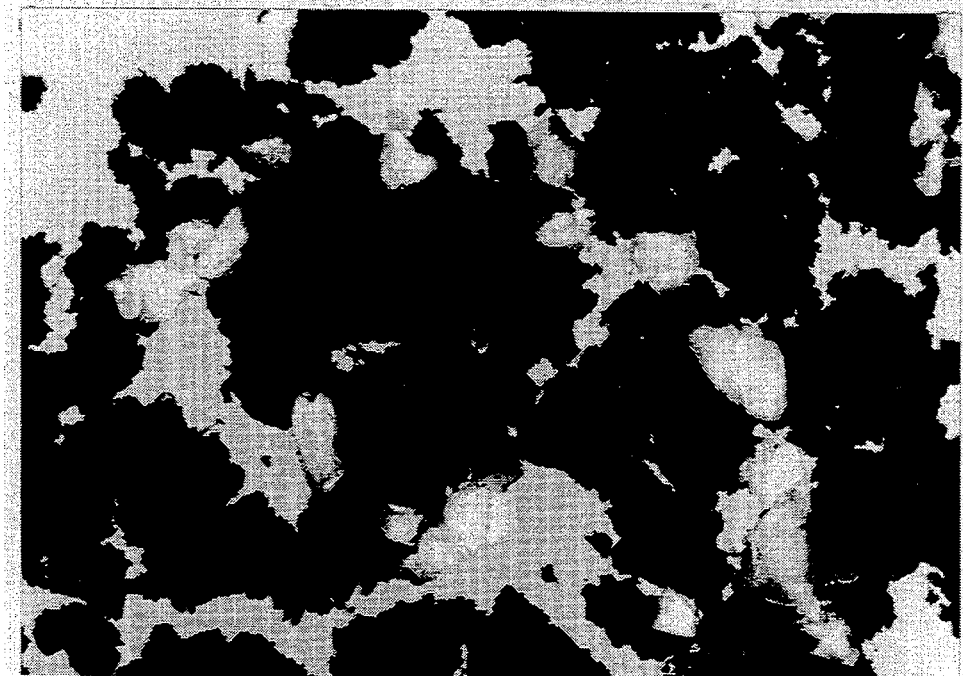
FIG. 2 shows plastic particles which have not been surface-modified. It can be seen here that the surface of the plastic particles is not wetted by sewage sludge and no sewage accumulates.

COMPARATIVE EXAMPLE 10b 6 l of mixed sludge were flocculated by means of 1.8 l of Sedipur solution (0.1% w/v), and the mixture is filtered as described in Example 10, but without addition of plastic and Butonal, in a bench pressure filter unit. The filtering resistance achieved was 90 $10^{12}$ mPas/m² according to the above formula.

EXAMPLE 11

82 kg of mixed sludge containing 4.5% of SDM were mixed with ground plastic (117.5 g of polyvinyl chloride, 117.5 g of polystyrene and 117.5 g of polypropylene) and flocculated in a cylindrical stirrer at 450 rpm and at a flow rate of 630 l/h by addition of 17.6 l of Sedipur CF 604 (0.1% w/v).

The mixture was subsequently introduced into a membrane filter press (filter area 40 cm 40 cm, chamber depth 32 mm, polypropylene filter cloths) for 15 minutes at a maximum of 4 bar and pressed for 80 minutes at up to 15 bar. This gave 10.1 kg of filter cake containing on average 40.45% of dry matter and 36.8% of SDM. The average calorific value was 4602 kJ/kg ($\triangleq$1101 kcal/kg).

We claim:
1. A process which comprises:
    a) comminuting plastic waste material,
    b) mixing the comminuted plastic waste material with sewage sludge containing organic flocculant material,
    c) filtering the mixture of comminuted plastic waste material, sewage sludge and organic flocculant to produce a filter cake, and
    d) incinerating the filter cake to produce an ash.
2. The process of claim 1, wherein the sewage sludge further contains at least one member selected from the group consisting of finely divided coal and ash.
3. The process of claim 1, wherein the surface properties of the plastic are modified with binders in such a way that the binding capacity between the plastic and the sludge is improved.
4. The process of claim 1, wherein the ash is deposited in a sanitary landfill.
5. The process which comprises:
    a) filtering a mixture of sewage sludge and organic flocculants,
    b) comminuting plastic waste material,
    c) mixing the comminuted plastic waste material with the filtered mixture of sewage sludge and organic flocculants,
    d) incinerating the resulting mixture to produce an ash.
6. The process of claim 5, wherein the ash is deposited in a sanitary landfill.
7. The process of claim 5, wherein the mixture resulting from step c) is filtered to produce a filter cake and in step d), the resulting mixture is incinerated in the form of a filter cake to produce an ash.

* * * * *